United States Patent
Sundaresan

(10) Patent No.: US 7,219,072 B1
(45) Date of Patent: May 15, 2007

(54) METHOD AND SYSTEM FOR CO-BROWSING IN ELECTRONIC COMMERCE

(75) Inventor: Neelakantan Sundaresan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1361 days.

(21) Appl. No.: 09/323,605

(22) Filed: Jun. 1, 1999

(51) Int. Cl.
*G06F 15/16* (2006.01)

(52) U.S. Cl. .................... 705/26; 709/204; 709/205

(58) Field of Classification Search ................ 705/26, 705/27; 709/204, 227, 205; *G06F 17/60, G06F 17/30*
See application file for complete search history.

(56) References Cited

U.S. PATENT DOCUMENTS

| | | | |
|---|---|---|---|
| 5,754,938 A | | 5/1998 | Herz et al. |
| 5,796,393 A | | 8/1998 | MacNaughton et al. |
| 5,796,395 A | | 8/1998 | de Hond |
| 5,835,087 A | * | 11/1998 | Herz et al. .................. 345/810 |
| 5,901,287 A | * | 5/1999 | Bull et al. .................. 709/218 |
| 5,931,912 A | * | 8/1999 | Wu et al. ...................... 9/224 |
| 5,974,446 A | * | 10/1999 | Sonnenreich et al. ....... 709/204 |
| 5,991,751 A | * | 11/1999 | Rivette et al. ................. 707/1 |
| 6,029,195 A | * | 2/2000 | Herz ........................ 725/116 |

(Continued)

FOREIGN PATENT DOCUMENTS

EP    0 820 028 A2 *   1/1998

EP    0 875 844 A2 *   4/1998

OTHER PUBLICATIONS

Fernandes, Businesses Have a chat, Business Journal-San Jose, v15 N9 p. 1, Jun. 30, 1997.*

(Continued)

*Primary Examiner*—Cuong Nguyen
(74) *Attorney, Agent, or Firm*—Gates & Cooper LLP

(57) ABSTRACT

A method, apparatus, and article of manufacture for providing co-browsing by users shopping over a computer network, such as an internet. The method comprises: providing a network site offering items for sale; providing to a first user of the network site capability to inform the network site of interest in co-browsing with a second user; providing to the second user of the network site capability to inform the network site of interest in co-browsing with the first user; and providing a capability for communication between the interested first and second users while they continue to shop. Users are provided with a window for interfacing with the network site, wherein the window comprises a first pane that displays items for sale and a second pane that displays content of the communication between the first and second user. A proxy server protects identity of the users. The browsing pattern of at least one of the first or second users can be monitored, and users of a common browsing pattern can be identified and informed of the common browsing pattern. The first user can be provided with capability to inform the network site of subject matter of interest to the user. The second user can then be selected based on characteristics the second user shares with the first user, and notified of the characteristics shared with the first user. The capability to inform the network site of interest in co-browsing comprises capability to inform the network site of conditions required for co-browsing.

24 Claims, 2 Drawing Sheets

U.S. PATENT DOCUMENTS 6,081,900 A * 6/2000 Subramaniam et al. ..... 713/201
6,223,177 B1 * 4/2001 Tatham et al. ................. 707/9

OTHER PUBLICATIONS

From Proquest, Product & Services—Nortel Links Web-Based document sharing & Audio Conferencing in New Collaboration Product.; other market entries also noted, Telecommuting Review, pp. 5-7, vol. 15—issue 10, Oct. 1998.*

Sakamoto et al., Collaborative WWW Browsing system through supplement of awareness, 4th Inter. Conf. on knowledge-based intelligent engineering systems & allied technologies, Sep. 1, 2000, Brighton UK.*

Hodges et al., Multimedia Computing, Addison-Wesley Publishing Company, Inc.pp. 161-169, 1993.*

From Proquest, IBM: New Lotus products to deliver innovative 'sametime' collaboration benefits to business, M2 Presswire, Coventry; May 20, 1998 (3 pages).* de Jesus Hoyos Rivera et al., A design framework for collaborative browsing, 10th IEEE Inter. workshops on 2001, pp. 362-367.*

Kim et al., Collaborative multimedia middleware architecture & advanced Internet call center, 15th Inter. Conf. on Information Networking, 2001, pp. 246-250.*

McKinley et al., Pocket Pavilion: a synchronous collaborative browsing application for wireless handheld computers, Tech. Rep. MSU-CPS-99-38, Dept. of Computer Science & Engineering, MSU, East Lansing, Michigan, Nov. 1999.*

Yang et al., Client browsing module for Internet collaborations, IEEE 2001, pp. 2317-2321.*

Hodges et al., Multimedia computing—Case studies from MIT Project Athena, Addison-Wesley Publishing Company, Inc., 1993, pp. 164, 166-167 and Figs. 2.2, 2.4.*

From Proquest, IBM: New Lotus products to deliver innovative 'sametime' collaboration benefits to business, M2 Presswire; Coventry; May 20, 1998.*

From http://www.findarticles.com, Let's share and share alike, Computer Weekly, Oct. 1, 1998.*

From http://www.findarticles.com, Review: Windows-only eRoom simplifies remote project management by Mike Heck of InfoWorld, Dec. 21, 1998.*

Wu Gangshan et al., A knowledge sharing and collaboration system model based on Internet, Dept. of Computer Science & Technology, China, from 1999 IEEE.*

"NTT Software and Stumpworld Provide New Dimension to Internet Retailing Through Live Celebrity Chat", Business Wire, Oct. 5, 1998, 3pp.

Frederick A. Crawford, Six Winning Strategies for Web Selling (Focus: Internet Retailing) Chain Store Age Executive with Shopping Center Age, vol. 74, Issue No. 5, May 1, 1998, 5pp.

* cited by examiner

METHOD AND SYSTEM FOR CO-BROWSING IN ELECTRONIC COMMERCE

BACKGROUND OF THE INVENTION

1. Field of the Invention

This invention relates in general to electronic commerce, and more particularly, to co-browsing in an electronic commerce system.

2. Description of Related Art

As an increasing number of consumers use computers for shopping via electronic commerce ("e-commerce") stores, there is an increasing desire to provide facilities to bring the consumer closer to the conventional shopping experience. For example, e-commerce web sites offer virtual shopping carts, to which a buyer adds items to be purchased while continuing to shop, and express check out options for quick exit from the site when orders are small and fixed.

A familiar scenario in conventional stores, such as bookstores and video stores, includes shoppers browsing on the same aisle who engage in conversation. The shoppers may consult one another for suggestions or comments regarding recommended titles or products. The shoppers might help one another find an item of interest, or engage in discussion stemming from their common interest in a particular category of products.

As the geographical location of stores becomes mostly irrelevant in the web retail environment, and as the number of e-commerce shoppers increases, competition increases. There is a need in the art for methods and systems to attract and retain e-commerce customers, such as by offering attractive shopping environments that introduce elements of more conventional and personalized shopping experiences into the electronic marketplace.

SUMMARY OF THE INVENTION

To minimize the limitations in the prior art described above, and to minimize other limitations that will become apparent upon reading and understanding the present specification, the present invention discloses a method, apparatus, and article of manufacture for providing co-browsing for users shopping over a computer network, such as an internet. In one embodiment, the method comprises the steps of: (a) providing a network site offering items for sale; (b) providing to a first user of the network site capability to inform the network site of interest in co-browsing with a second user; (c) providing to the second user of the network site capability to inform the network site of interest in co-browsing with the first user; and (d) providing a capability for communication between the interested first and second users while they continue to shop on the network site. Preferably, the capability for communication comprises a proxy server that protects identity of the users.

In a preferred embodiment, the method further comprises providing the users with a window displayed on the user's computer screen for interfacing with the network site. The window comprises a first pane that displays items for sale and a second pane that displays content of the communication between the first and second user. This window provides the user with the ability to engage in the shopping/browsing experience contemporaneously with a chat session with another shopper, so that the chat session can directly relate to and influence the user's shopping experience while the shopping/browsing is in progress.

The method can further comprise monitoring the browsing pattern of at least one of the first or second users, identifying at least two users of a common browsing pattern and informing the at least two users of the common browsing pattern. The method can further comprise providing the first user with capability to inform the network site of subject matter of interest to the user. The second user can then be selected based on characteristics the second user shares with the first user, and optionally, notified of the characteristics shared with the first user. The characteristics can include, for example, the subject matter of interest to the user. In one embodiment of the method, the capability to inform the network site of interest in co-browsing comprises capability to inform the network site of conditions required for co-browsing.

An apparatus for providing co-browsing by users shopping over a network in accordance with the invention can comprise an electronic commerce server connected to the network for offering items for sale, and a co-browsing facility provided by the electronic commerce server. The co-browsing facility allows a first user that is browsing the items for sale to conditionally know whether a second user is also browsing the items for sale and then provides a communication medium for a conversation between the first and second users via the electronic commerce server while the first and second users both continue to browse the items for sale.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the description of the preferred embodiment, reference is made to the accompanying drawings which form a part hereof, and in which is shown by way of illustration a specific embodiment in which the invention may be practiced. It is to be understood that other embodiments may be utilized, as structural changes may be made without departing from the scope of the present invention.

Overview

The invention provides a new approach to e-commerce in which users are provided with an opportunity for co-browsing with other shoppers while continuing to shop for an item offered for sale over a computer network. As a shopper browses items of a particular category, which can be compared to an aisle in a conventional store, the shopper can inquire about other shoppers browsing the same aisle at that time. The shopper may identify himself or herself through either a real name or a pseudonym, and publish his or her interests and browsing profile to other shoppers on the aisle.

When a shopper requests information about other shoppers having a particular profile, the system lists all shoppers who satisfy the request. The system publishes information to only those shoppers willing to publish their own information. The shopper then selects one or more shoppers from the list, and the system notifies the selected shoppers that another shopper is interested in engaging in conversation with them. The shoppers so notified can then indicate whether they agree to the conversation request or prefer not to participate. If a notified shopper agrees to the request, the system initiates a chat session between the interested shoppers.

The method of the invention assists e-commerce vendors in attracting and retaining customers. The method provides a facility for bringing the user's shopping experience closer to familiar, traditional shopping experiences. For example, most shoppers are familiar with the ability to chat with other shoppers browsing similar items in a conventional store, and with the ability to exchange suggestions and recommendations regarding the available selections.

In addition, the method of the invention can incorporate tracking of shopper navigational behavior and previous visit histories. An e-store can maintain such information in its database and, optionally, use this information to facilitate matching shoppers with other shoppers having similar interests or with whom they have co-browsed in the past. The method can also be used to provide anonymity to co-browsing shoppers. In another aspect of the invention, the method can permit users to set conditions necessary for engaging in co-browsing with other shoppers.

These and other advantageous features can be incorporated into the invention, as is apparent from the following description of the implementation of the invention.

Hardware Environment

Figure 1:
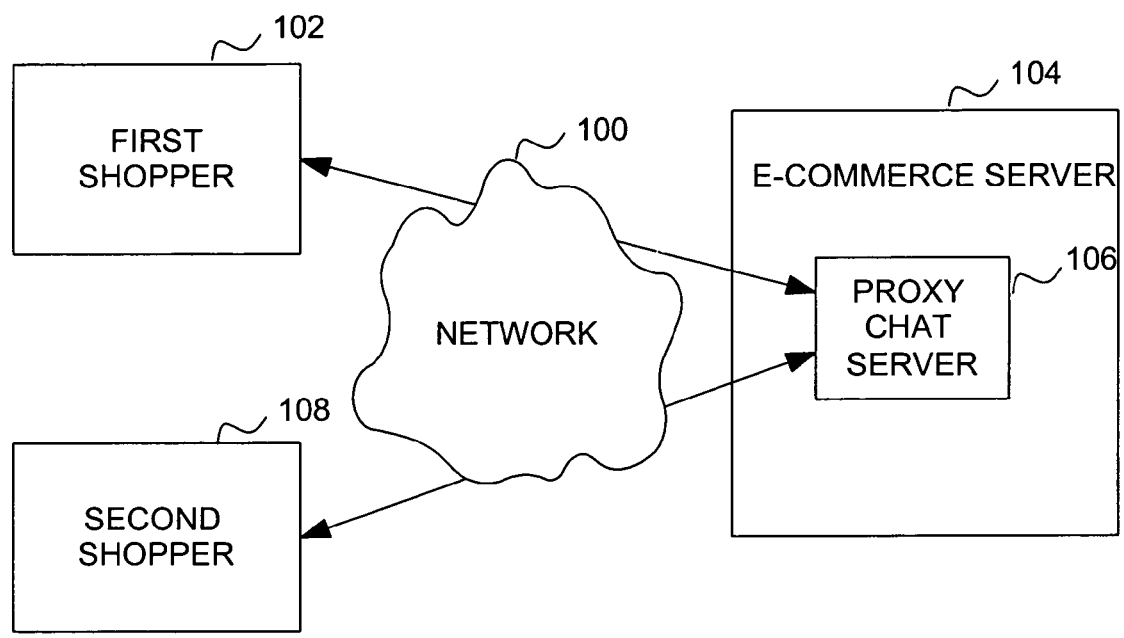
FIG. 1 is a block diagram of an exemplary hardware environment of the preferred embodiment of the present invention, and more particularly, illustrates a typical computer network through which users can access a commercial website.

FIG. 1 is a block diagram of an exemplary hardware environment of the preferred embodiment of the present invention, and more particularly, illustrates a typical computer network 100 that connects one or more clients 102 to one or more servers, such as an e-commerce web server 104. The network 100 preferably comprises the Internet, although it could also comprise intranets, extranets, LANs, PANs, WANs, etc. A typical combination of resources may include clients 102, 108 that are personal computers or workstations operated by shoppers, and servers 104 that are personal computers, workstations, minicomputers, and/or mainframes.

Each of the computers generally include, inter alia, a processor, random access memory (RAM), data storage devices, data communications devices, display devices, input devices, etc. Of course, those skilled in the art will recognize that any combination of the above components, or any number of different components, peripherals, and other devices, may be used in the present invention.

In a preferred embodiment of the present invention, the e-commerce web server 104 executes a server program that provides a shopping environment. Included in the shopping environment is an opportunity to co-browse with other shoppers via a proxy chat server 106. The proxy chat server 106 facilitates a chat session while protecting the identity of the participating shoppers. Input from a first shopper or client 102 goes to the proxy chat server 106, which then forwards the input to the second shopper or client 108, as appropriate. In this manner, information is passed between the two shoppers 102, 108 through the proxy chat server 106.

Generally, the components of the present invention comprise instructions and/or data which, when read, executed, and/or interpreted by the client 102, 108 and/or e-commerce web server 104, causes the client 102, 108 and/or e-commerce web server 104 to perform the steps necessary to implement and/or use the present invention. Often, these instructions and/or data are embodied in and/or readable from a device, carrier, or media, such as a memory, data storage device, or other device capable of being coupled to the computer.

Thus, the present invention may be implemented as a method, apparatus, or article of manufacture using standard programming and/or engineering techniques to produce software, firmware, hardware, or any combination thereof. The term "article of manufacture" as used herein is intended to encompass instructions and/or data accessible from any device, carrier, or media.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Operation of Co-Browsing

In a preferred embodiment, a simple web-based system embodying the co-browsing concept is implemented. As noted above in FIG. 1, the system is comprised of clients 102, 108 and a network 100, through which a user can access an e-commerce web server 104. The client 102, 108 provides the user interface, and the e-commerce web server 104 offers items for sale. The user can shop by visiting the site, browsing items offered for sale, and, if desired, chatting with other shoppers having similar interests.

Shopping Environment

A user visits the e-commerce site 104 of a vendor, browses the site, and is made aware of the opportunity to interact with other shoppers visiting the same site. The site 104 has a facility for both notifying users of the opportunity for co-browsing and receiving information from users about their interest in co-browsing. This opportunity can be provided in the form of a text window into which the user types the relevant information. The user 102, 108 and/or e-commerce server 104 may set conditions that must be satisfied before a co-browsing session is initiated.

Co-Browsing Interface

In a preferred embodiment, shoppers are provided with a window, displayed on the user's computer screen, for interfacing with the network site. The window comprises a first pane that provides access to the e-store and, for example, displays items for sale or information about available items. The window further comprises a second pane that displays content of the communication with one or more co-browsers. This window comprising at least two panes provides the user with the ability to engage in the shopping/browsing experience contemporaneously with a chat session with one or more additional shoppers. This allows the user to participate in a chat session that will directly relate to and influence the user's shopping experience. The ability to chat with fellow shoppers while browsing brings the user's experience closer to a familiar, conventional shopping experience.

Identification of Potential Co-Browsers

The e-commerce web server 104 can monitor the browsing behavior of shoppers visiting the site. Information can be tracked regarding the items and categories of items viewed by the shopper, search terms entered by the shopper, and the price range or other characteristics of items viewed by the shopper. In addition, the server 104 can access stored information regarding previous visits and purchases made by the shopper, including past co-browsing behavior, as well as any information about the shopper that may have been provided by the shopper during the current or a previous visit. Users who have previously engaged in co-browsing can be preferentially targeted for co-browsing on return visits. Likewise, those visitors who have declined co-browsing opportunities can be given an opportunity to request no further invitations to co-browse.

Potential co-browsers can be identified by searching for other shoppers having browsing or purchasing profiles or other characteristics in common with a first shopper. These potential co-browsers, or target shoppers, can then be prompted to consider participating in a chat session by informing the target shopper of the presence of other shoppers having similar characteristics and/or interests. Alternatively, the target shopper may have already indicated an interest in co-browsing, and thus need only be notified of the potential match.

Thus, a first and second shopper can be identified as potential co-browsers and invited to participate in a chat session under a variety of permutations. For example, the first shopper could have requested co-browsing and the second shopper could have been targeted for co-browsing on the basis of the second shopper's browsing or other characteristics. Alternatively, both the first and second shoppers could have initiated co-browsing by request. In another embodiment, both the first and second shoppers were targeted as having common browsing interests and both invited to participate in a chat session. Likewise, additional shoppers could be brought into a chat session, whether by request of the shopper or by invitation from the e-store.

In one embodiment, shoppers are notified if other shoppers with whom they have previously co-browsed are currently available for co-browsing. This notification can be initiated by either the e-commerce server drawing on stored information, or by a shopper. Shoppers notifying the e-commerce server of their interests or conditions for co-browsing can be provided with an opportunity to indicate other shoppers with whom they have previously co-browsed and to identify those shoppers with whom they would prefer to co-browse again and/or those with whom they do not wish to co-browse again.

Protecting Shopper Anonymity

In a preferred embodiment, the e-commerce server comprises an intermediate proxy server. The proxy server passes information between shoppers. Input from each shopper goes to the proxy server, which then forwards the information to the appropriate user. The proxy server can control the flow of information between shoppers and prevent the unwanted passage of specified information to shoppers. This proxy server can thereby protect the identity of shoppers who wish to remain anonymous.

Shoppers can be provided with an opportunity to indicate which information may be published and which information is to remain confidential. The shopper can also be permitted to identify conditions on the publication of information. For example, the shopper may wish to retain confidentiality of some information until after obtaining preliminary information about a potential co-browser. Once certain conditions are met, the shopper may authorize the publication of the additional information.

The shopper may further restrict to whom the information is published. These options can be employed to help shoppers feel more comfortable participating in a chat session. The retention of certain information in confidence can also allow the e-store to access information that will facilitate marketing and improvement of methods for identification of potential co-browsers. Without assurances of confidentiality, such information would otherwise not be available to the e-store.

Logic of Co-Browsing Implementation

Figure 2:
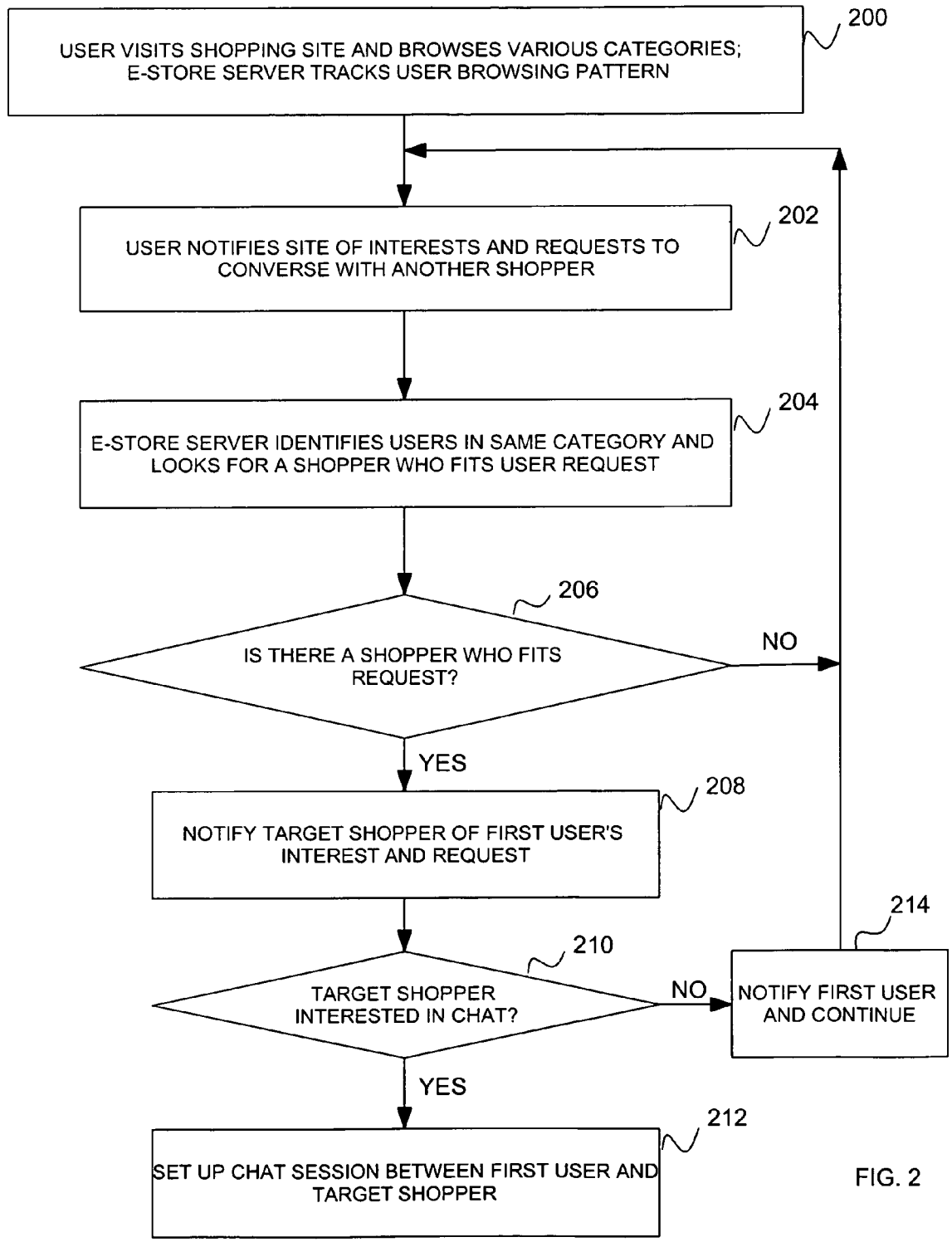
FIG. 2 is a flowchart illustrating the logic performed when using a method of providing co-browsing in accordance with a preferred embodiment of the invention.

FIG. 2 is a flowchart illustrating the logic performed when using a method of providing co-browsing in accordance with a preferred embodiment of the invention. Of course, those skilled in the art will recognize that other logic may be used without departing from the scope of the present invention.

Block 200 represents the user visiting an e-commerce site to browse one or more items or categories of items, and the e-store server contemporaneously tracking the user's browsing pattern.

Block 202 represents the user notifying the site of his or her interests and making a request to converse with another shopper.

Block 204 represents the e-store server identifying users browsing in the same category of items and looking for a shopper who fits the first user's request.

Block 206 represents the system determining, on a yes/no basis, if there is a shopper who fits the first user's request. If the determination yields a negative response, the system returns to block 202, where the user can notify the site of a continued interest in conversing with another shopper.

Block 208 represents the system, pursuant to an affirmative response to the determination of block 206, notifying the target shopper who fits the first user's request of the interests and request of the first user.

Block 210 represents the system asking the target shopper if he or she is interested in engaging in a chat session with the first user.

Block 212 represents the system setting up a chat session between the first user and the target shopper pursuant to an affirmative response to the question of block 210.

Block 214 represents the system notifying the first user of the denied request and continuing with block 202, where the user can indicate a continued interest in conversing with another shopper.

CONCLUSION

This concludes the description of the preferred embodiment of the invention. The following describes some alternative embodiments for accomplishing the present invention.

In summary, illustrated herein are various embodiments of the method for providing co-browsing for users shopping over a computer network. The method provides an e-commerce shopping environment that more closely emulates conventional shopping experiences familiar to users. Users can converse with fellow shoppers while continuing to browse, and benefit from the opportunity to exchange suggestions and recommendations with fellow shoppers. Vendors can benefit from creating a more attractive shopping environment.

For example, those skilled in the art will recognize that any type of computer configuration and/or network configuration could be used in the present invention. Those skilled in the art will also recognize that many types of computer programs could be used with the present invention, in addition to those enumerated herein. In addition, those skilled in the art will also recognize that many types of co-browsing arrangements could be incorporated into the present invention.

In summary, the present invention discloses a method, apparatus, and article of manufacture for providing co-browsing for users shopping over a computer network. A network site offering items for sale is provided. A first user is then provided with the capability to inform the network site of interest in co-browsing with a second user of the network site. The second user is provided with capability to inform the network site of interest in co-browsing with the first user. A capability is provided for communication between the interested first and second users while they continue to shop. Preferably, the capability for communication comprises a proxy server that protects the identity of the users.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for providing co-browsing by users shopping over a computer network, comprising the steps of:
    (a) providing a network site offering items for sale;
    (b) monitoring the browsing patterns of a first user of the network site and of a second user of the network site;
    (c) identifying a common browsing pattern of the first and second users;
    (d) informing the users of the common browsing pattern;
    (e) providing to the first user of the network site capability to inform the network site of interest in co-browsing with the second user;
    (f) providing to the second user of the network site capability to inform the network site of interest in co-browsing with the first user; and
    (g) providing a capability for communication between the interested first and second users while they continue to shop on the network site.

2. The method of claim 1, further comprising providing the users with a window for interfacing with the network site, wherein the window comprises a first pane that displays information relating to items for sale and a second pane that displays content of the communication between the first and second user.

3. The method of claim 1, wherein the capability for communication comprises a proxy server that protects identity of the users.

4. An article of manufacture comprising a computer program carrier readable by a computer and embodying one or more instructions executable by the computer to perform method steps for:
    (a) providing a network site offering items for sale;
    (b) monitoring the browsing patterns of a first user of the network site and of a second user of the network site;
    (c) identifying a common browsing pattern of the first and second users;
    (d) informing the users of the common browsing pattern;
    (e) providing to the first user of the network site capability to inform the network site of interest in co-browsing with the second user;
    (f) providing to the second user of the network site capability to inform the network site of interest in co-browsing with the first user; and
    (g) providing a capability for communication between the interested first and second users while they continue to shop on the network site.

5. The article of manufacture of claim 4, wherein the method further comprises providing the users with a window for interfacing with the network site, wherein the window comprises a first pane that displays information relating to items for sale and a second pane that displays content of the communication between the first and second user.

6. The method of claim 1, further comprising providing the first user with capability to inform the network site of subject matter of interest to the user.

7. The method of claim 6, wherein the second user is selected based on characteristics the second user shares with the first user.

8. The method of claim 7, further comprising notifying the second user of the characteristics shared with the first user.

9. The method of claim 7, wherein the characterstics include the subject matter of interest to the user.

10. The method of claim 1, wherein the capability to inform the network site of interest in co-browsing comprises capability to inform the network site of conditions required for co-browsing.

11. An apparatus for providing co-browsing by users shopping over a network, comprising:
    (a) an electronic commerce server connected to the network for offering items for sale; and
    (b) a co-browsing facility, provided by the electronic commerce server, that allows a first user that is browsing the items for sale to conditionally know whether a second user is also browsing the items for sale and then provides a communication medium for a conversation between the first and second users via the electronic commerce server while the first and second users both continue to browse the items for sale on the network site, wherein the electronic commerce server is capable of monitoring the browsing pattern of at least one of the first or second users, and wherein the electronic commerce server is further capable of identifying at least two users of a common browsing pattern and informing the at least two users of the common browsing pattern.

12. The apparatus of claim 11, wherein the co-browsing facility comprises a window for interfacing with the network site, wherein the window comprises a first pane that displays information relating to items for sale and a second pane that displays content of the communication between the first and second user.

13. The apparatus of claim 11, wherein the communication medium comprises a proxy server that protects identity of the users.

14. The article of manufacture of claim 4, wherein the capability for communication comprises a proxy server that protects identity of the users.

15. The article of manufacture of claim 4, wherein the capability to inform the network site of interest in co-browsing comprises capability to inform the network site of conditions required for co-browsing.

16. The apparatus of claim 11, wherein the electronic commerce server provides the first user with capability to inform the server of subject matter of interest to the user.

17. The apparatus of claim 16, wherein the second user is selected based on characteristics the second user shares with the first user.

18. The apparatus of claim 17, wherein the server notifies the second user of the characteristics shared with the first user.

19. The apparatus of claim 17, wherein the characteristics include the subject matter of interest to the user.

20. The apparatus of claim 11, wherein the co-browsing facility comprises capability to inform the network site of conditions required for co-browsing.

21. The article of manufacture of claim 4, wherein the method further comprises providing the first user with capability to inform the network site of subject matter of interest to the user.

22. The article of manufacture of claim 21, wherein the second user is selected based on characteristics the second user shares with the first user.

23. The article of manufacture of claim 22, wherein the method further comprises notifying the second user of the characteristics shared with the first user.

24. The article of manufacture of claim 22, wherein the characteristics include the subject matter of interest to the user.

* * * * *